Dec. 10, 1968  S. A. JANSSON  3,414,942
TENSIONING DEVICE FOR CHAINS OR THE LIKE
Filed Feb. 23, 1967  4 Sheets-Sheet 1

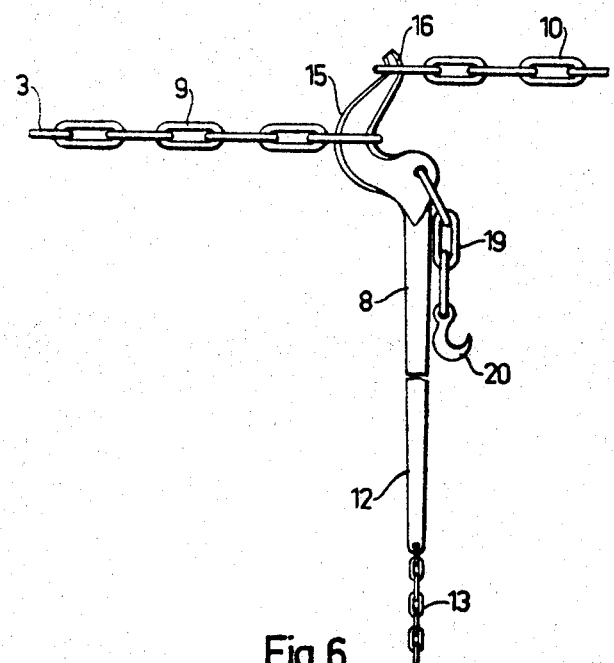
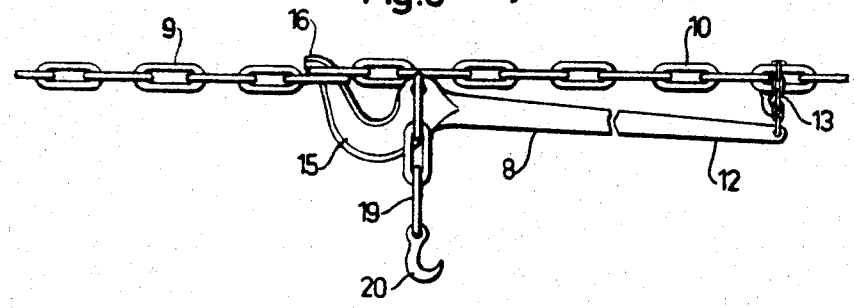

United States Patent Office 3,414,942
Patented Dec. 10, 1968

3,414,942
TENSIONING DEVICE FOR CHAINS
OR THE LIKE
Sven Andreas Jansson, Orsa, Sweden, assignor to Seasafe
Transport AB, Stockholm, Sweden
Filed Feb. 23, 1967, Ser. No. 618,198
Claims priority, application Sweden, Mar. 4, 1966,
2,892/66
3 Claims. (Cl. 24—69)

ABSTRACT OF THE DISCLOSURE

A lever with a double bent end forming an angle with the lever axis pivoted at the root of said end in order to enable the tensioning of two chains. The lever end comprises a larger curved part, curved in one direction intended to engage one link of one of said chains, and a nose-shaped part curved in the other direction adapted to engage one link after the other of the other of said chains. The pivoting center and the centers of curvature of both curved parts are located on a straight line.

BACKGROUND OF THE INVENTION

Field of the invention

The invention relates to a tensioning device for chains or the like. Such devices have a large field of application. They can be used as securing means when cars or other vehicles are to be transported on ships or other transportation means. They can further be used for strapping timber, tubes etc.

DESCRIPTION OF THE PRIOR ART

Prior art devices for tensioning two chains or chain portions and the like have consisted of a lever, one end of which had the shape of a double bent part, the first bend, during tensioning, engaging a link of a first chain portion and the other bend engaging a link of a second chain portion whereupon the lever was swung towards the chain portion engaged by the outer bend, so that both chain portions were moved towards each other. Such prior art device had the drawback that the greatest length by which the chain portions could be moved towards each other was at a maximum equal to the length of one chain link. The chain tension thus achieved proved in most cases to be insufficient.

In order to overcome this drawback the aim was to provide a device which would make it possible to tension chains step by step by a repeated reciprocating swinging movement of the lever. In prior art this has been achieved by providing the lever with various kinds of ratchet devices. Thus prior art devices make it indeed possible to tension chains step by step but their structure is quite complicated. Such prior art tensioning devices are thus provided with several machined, curved gliding surfaces, ratchet wheels etc. so that they are comparatively heavy and expensive to manufacture. Experience has also proved that said prior art devices are not sufficiently sturdy. Such devices are generally so badly damaged when run over by a truck wheel for instance, that they are unfit for any further use. The present invention intends to overcome these and other drawbacks by providing a very simple and sturdy tensioning device for chains and the like, said device comprising no movable elements whatsoever, so that it is light-weight, inexpensive to manufacture and resistant to mechanical damage.

SUMMARY OF THE INVENTION

The present invention thus relates to a device for tensioning two chains or chain portions and the like, said device consisting of a lever, one end of which is provided with a double bent part comprising a first, larger curved part adjacent to the lever and a second, smaller, nose-shaped part curved in the opposite direction, whereas, for tensioning, the first curved part is arranged to engage one link of a first chain or chain portion and the second, nose-shaped curved part is arranged to engage one link after the other in a second chain or chain portion, the curved part being so arranged, that said first and second chains or chain portions are moved towards each other when the lever is being swung towards said second chain or chain portion, a third short chain or chain portion being pivotally mounted in the lever at the root of the first larger, curved part, said third chain being at its free end provided with a hook arranged to engage one link of said second chain or chain portion each time the lever is swung for tensioning the chains or chain portion by one step.

The invention is characterized in that the pivoting center of the third chain, the center of the inner curvature of the first, larger curved part and the center of the inner curvature of the second, nose-shaped curved part are substantially located on a straight line called center line.

A preferred embodiment of the invention is characterized in that the pivoting center of the third chain is essentially located on the longitudinal axis of the lever, called reference line, and that the center line and the reference line form together a certain angle which is larger than 15°, preferably 20°–25°.

It has appeared that the size, the shape and the location of the curved parts are of the highest importance for a satisfactory operation of the device and that said factors depend upon the size of the individual chain links.

For the optimal operation of the device the sizes of the radii of curvature as well as the location of the centers of curvature are determined by the individual chain links.

BRIEF DESCRIPTION OF DRAWINGS

The invention will be more particularly described hereinafter with reference to the accompany drawings in which.

DETAILED DESCRIPTION OF THE INVENTION

Figure 1:
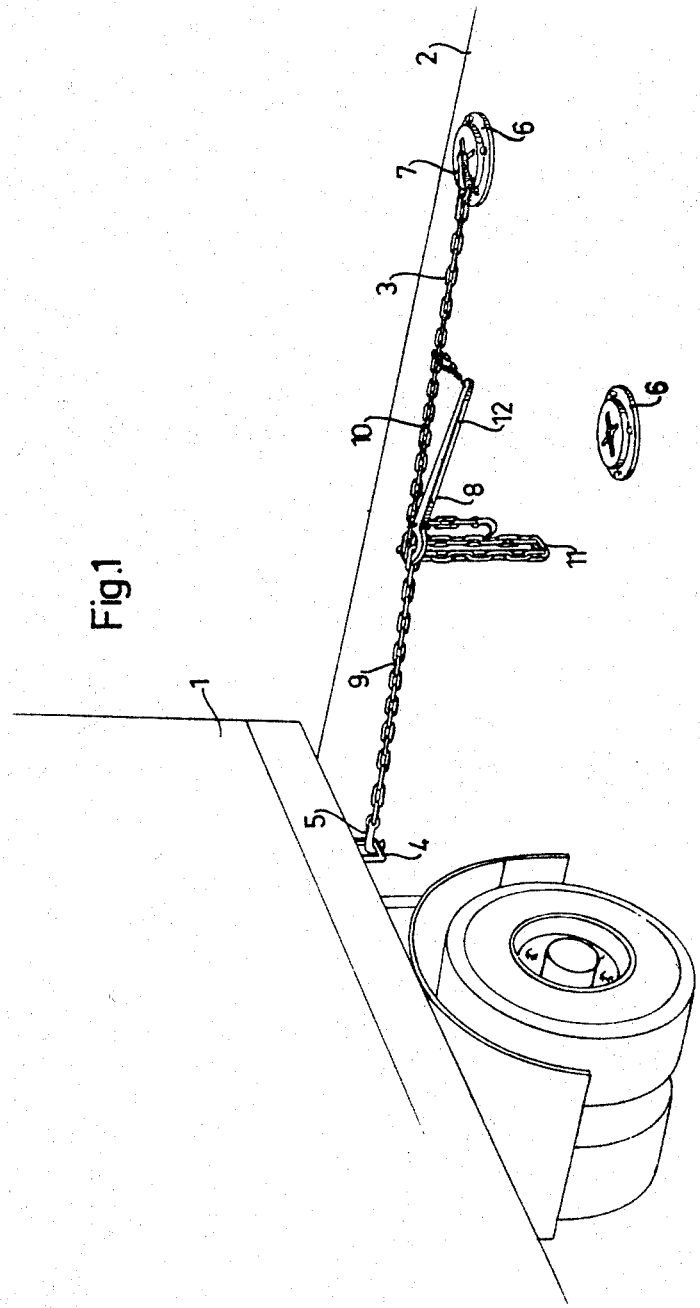
FIG. 1 illustrates a perspective side view of a tensioning device according to the invention in a position providing the required tension of a chain when securing a vehicle to the deck of a boat.

In FIG. 1 reference numeral 1 designates a transportation vehicle secured to a surface 2, for instance the deck of a boat, by means of a chain 3. The chain 3 is fastened to the truck 1 by means of a hook 5 engaged in a bracket 4 and to the boat deck 2 by means of a bulb hook 7 engaging a deck fitting 6. In FIG. 1, the chain 3 has been tensioned by means of a tensioning device 8 as will be described below, the tensioning device 8 joining to tension chain portions, namely a first chain portion 9 adjacent the truck 1 and a second chain portion 10 adjacent the deck fitting 6, while a chain portion 11 constituting the surplus length of the chain 3 after the tensioning of the vehicle is hanging slack between both said chain portions 9 and 10. The lever 12 of the tensioning device 8 is locked in position by means of a smaller chain 13 fitted to the end of the lever and surrounding the chain portion 10.

Figure 2:
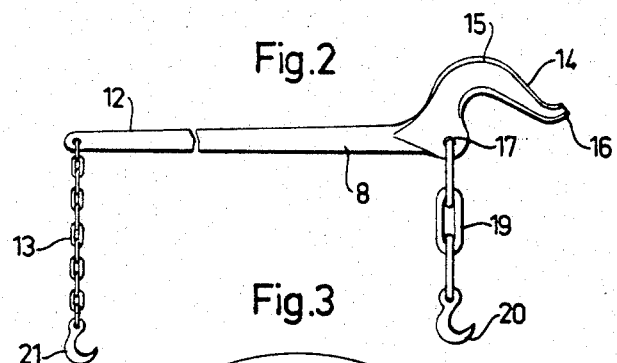
FIG. 2 is a side elevation of the tensioning device according to the invention.

As shown in FIG. 2 the tensioning device 8 according to the invention is constituted by a lever 12, one end 14 of which having a shape of a double bent part comprising a first, larger curved part 15 adjacent the lever 12 and a second, nose-shaped, smaller curved part 16 curved in the opposite direction.

Figure 3:
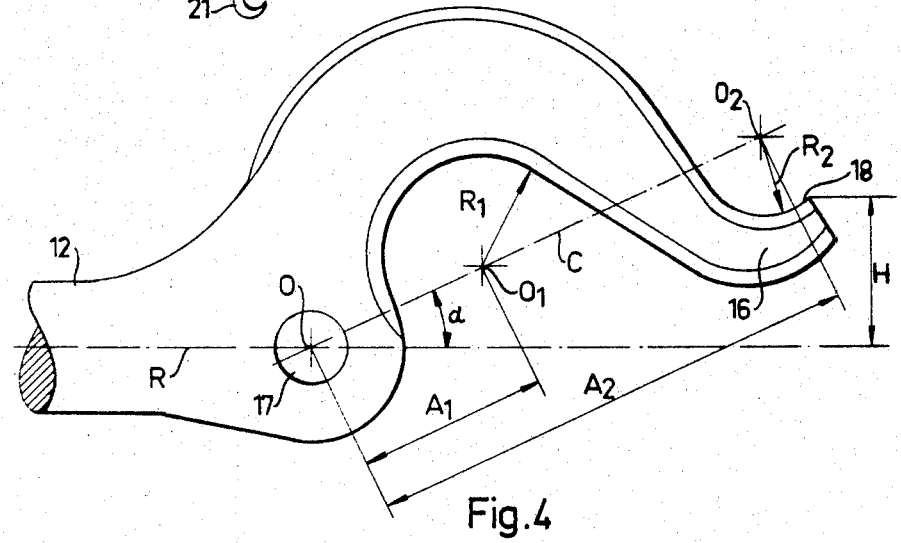
FIG. 3 is a detail view showing the double bent end part of the tensioning device shown in FIG. 2.

FIG. 3 is a detail view of said double bent end part. A cross hole 17 is provided at the root of said first, larger curved part 15, the center O of said hole 17 being substantially located on the longitudinal axis R of the lever 12, said axis being called reference line in the following. Reference $O_1$ designates the center of the inner curvature of said first, larger curved part and $O_2$ designates the center of inner curvature of the second, nose-shaped curved part. Reference $R_1$ designates the radii of inner curvature of the first, larger curved part and $R_2$ designates the radius of inner curvature of the second, smaller curved part 16. According to the invention the centers O, $O_1$ and $O_2$ are substantially located on a straight line C called center line in the following. The reference line R and the centerline C form a certain angle $\alpha$ which preferably amounts to 22°–25°.

Figure 4:
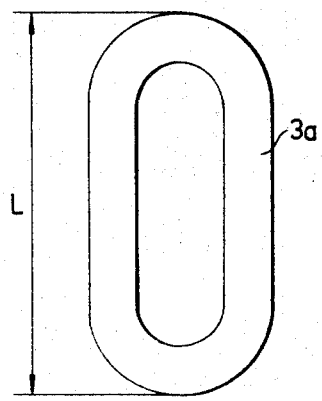
FIG. 4 is a view of an individual link of the securing chain shown in FIG. 1, FIGS. 5–9 illustrate the tensioning device of FIG. 1 shown in various positions during the tensioning of the chain.

FIG. 4 shows a link 3a of the chain 3 in FIG. 1 at the same scale as FIG. 3. According to the invention the locations of the centers $O_1$ and $O_2$ relative the center O and the reference line R as well as the sizes of the radii $R_1$ and $R_2$ are of the highest importance for the operation of the device and the position of said centers as well as the sizes of said radii are determined by the length L of the individual links of the chain 3. If L, as already mentioned, is the length of an individual link 3a of the chain 3, the distance $A_1$ between the centers O and $O_1$ is substantially equal to $L/2$, the distance $A_2$ between the centers O and $O_2$ is smaller than three times the distance $A_1$, that is to say smaller than $3L/2$. Further the radius of curvature $R_1$ is smaller than $L/3$ and the radius of curvature $R_2$ is substantially equal to $L/4$. According to the invention the distance H between the terminal edge 18 of the inner curvature of the second, smaller curved part 16 and the reference line R is smaller than $L/2$, that is to say smaller than half the length of an individual link 3a of the chain 3.

One end link of a chain portion 19 is pivotally mounted in the hole 17 of the device 8. The other end of the chain portion 19 is provided with a hook 20 arranged to engage one link of the chain portion 10, as described below, each time the lever is swung in order to tension the chain portion by one step. A hook 21 is fastened to the chain portion 13 secured to the other end of the lever.

FIGURES 5–9 illustrate the operation of the device. When operating the device the double bent part is introduced in one link of a chain 3 until said link engages the first, larger curved part 15 adjacent the lever 12. The chain portion engaging said first, larger curved part is tensioned by hand, the tensioning device 8 being held as shown in FIG. 5, whereafter the second chain portion 10 is also tensioned by hand so that a link of said chain portion can be brought into engagement with the second, smaller curved part 16. For the sake of clarity the slack chain portion 11 comprised between the chain portions 9 and 10 in FIG. 1 has not been shown in the FIGURES 5–9. The handle end of the lever 12 is thereafter swung towards the chain portion 10, the lever being considered as a one-sided lever arm with its pivoting center located on the inner curvature of the first, larger curved part 15. During said pivoting movement of the lever the chain portions 9 and 10 are moved towards each other to the position shown in FIG. 6. If the chain portions 9 and 10 are considered sufficiently tensioned when the lever 12 is in the position shown in FIG. 6, said lever can be locked in said position by winding the chain portion 13 around the chain portion 10 whereafter the hook 21 is brought to engage one of the links of the chain portion 13 as shown in the drawing.

Figure 7:
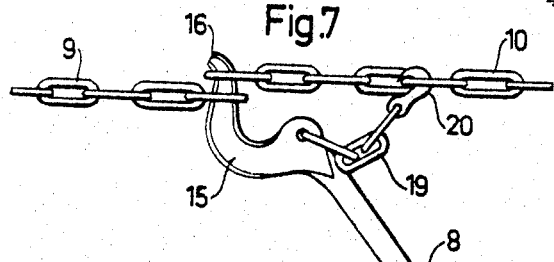

Should on the contrary the tension of the chain portions 9 and 10 not be sufficient, the hook 20 is brought into engagement with a link of the chain portion 10 as shown in FIG. 7.

Figure 8:
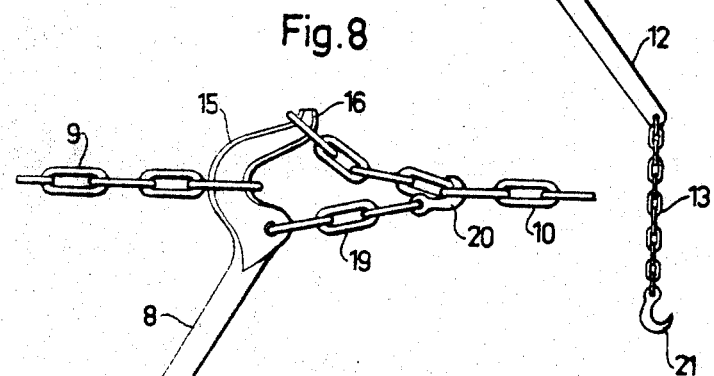
Figure 9:
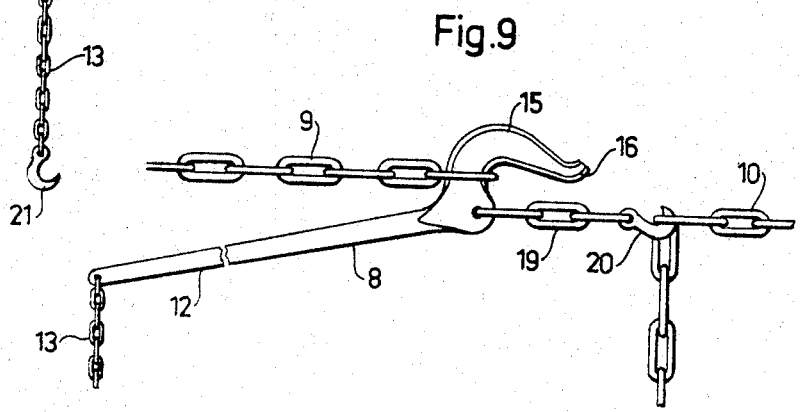

The lever 12 is thereafter swung in the opposite direction, that is to say towards the chain portion 9, the lever being again considered as a one-sided lever arm with its pivoting center located on the inner curvature of the first, larger curved part 15. As shown in FIG. 8 the chain portion 19 is tensioned so that the chain portion 10 is moved towards the chain portion 9 by the hook 20. If the chain portions 9 and 10 are then sufficiently tensioned, the lever 12 can be locked in the position shown in FIG. 9, by means of the chain portion 13 and the hook 20 as described above. If further tensioning of the chain portions 9 and 10 is required, the above described procedure can be repeated, the second smaller part 16 and the hook 20, respectively, being brought to engage link after link of the chain portion 10 with each stroke of the lever 12.

The tensioning device according to the invention has many advantages relative corresponding prior art devices. The device according to the invention is of simple structure and light-weight; it is further very sturdy as it does not comprise any movable parts or screw threads. The handle can be secured in any place along the whole length of the chain and allows an infinitely variable tensioning since the lever 12 can be locked in any position by means of the chain portion 13 and the hook 21. The shape of the double bent part further provides that the chain links slide very easily along the inner curvatures of the curved parts, so that less hand power is required for operating the lever 12.

Although the invention has been described in connection with an embodiment shown on the drawing, it is obvious that many alterations or modifications may be made within the scope of the appending claims.

What I claim is:

1. A device for tensioning two chain portions or the like, said device comprising a lever, one end of which is provided with a double bent part having a first, larger curved part adjacent the lever and a second, smaller, nose-shaped part curved in the opposite direction, the first curved part being arranged when the device is operated, to engage one link of a first chain portion and the second, nose-shaped curved part being arranged to engage one link after the other in a second chain portion, the curved parts being so arranged that said first and said second chain portions are moved towards each other when the lever is swung towards the second chain portion, a third short chain portion being pivotally mounted in the lever at the root of the first, larger curved part, said third chain portion being at its free end provided with a hook arranged to engage a link of the second chain portion each time the lever is swung for tensioning the chain portions by one step, characterized in that the pivoting center (O) of the third chain portion (19), the center of the inner curvature (O) of the first, larger curved part (15) and the center of inner curvature ($O_2$) of the second, nose-shaped curved part (16) are substantially located on a straight center line (C), which is disposed at an angle (α) relative to the longitudinal axis (R) of the lever.

2. A device as set forth in claim 1, characterized in that said angle (α) is larger than 15°, preferably between 22° and 25°.

3. A device as set forth in claim 1, characterized in that the pivoting center (O) of the third chain portion (19) is located on the longitudinal axis of the lever.

References Cited

UNITED STATES PATENTS

| | | | |
|---|---|---|---|
| 1,008,503 | 11/1911 | Wahlgren | 254—78 |
| 1,407,946 | 2/1922 | Nelson | 254—78 |

FOREIGN PATENTS

| | | |
|---|---|---|
| 85,374 | 1/1936 | Sweden. |
| 88,365 | 1/1937 | Sweden. |
| 15,203 | 1901 | Sweden. |

DONALD A. GRIFFIN, *Primary Examiner.*

U.S. Cl. X.R.

254—078